US007509656B2

(12) United States Patent
Bian et al.

(10) Patent No.: US 7,509,656 B2
(45) Date of Patent: Mar. 24, 2009

(54) COUNTER FUNCTIONS IN AN APPLICATION PROGRAM INTERFACE FOR NETWORK DEVICES (76) Inventors: Qiyong B. Bian, 2882 NW. Overlook Dr., #1818, Hillsboro, OR (US) 97124; Zhi Wang, 11549 SW. Davies Rd., #2604, Beaverton, OR (US) 97007

( * ) Notice: Subject to any disclaimer, the term of this patent is extended or adjusted under 35 U.S.C. 154(b) by 699 days.

(21) Appl. No.: 10/211,046

(22) Filed: Aug. 2, 2002

(65) Prior Publication Data

US 2004/0025172 A1 Feb. 5, 2004

(51) Int. Cl.
*G06F 9/46* (2006.01)
*H04L 12/26* (2006.01)

(52) U.S. Cl. .................. 719/328; 709/224; 370/252
(58) Field of Classification Search .......... 719/328; 370/252; 714/39; 709/224
See application file for complete search history.

(56) References Cited

U.S. PATENT DOCUMENTS

| 5,850,388 | A  | * | 12/1998 | Anderson et al. | 370/252 |
|-----------|----|---|---------|-----------------|---------|
| 6,084,856 | A  | * | 7/2000  | Simmons et al.  | 370/235 |
| 6,170,034 | B1 | * | 1/2001  | Weston-Lewis et al. | 711/4 |
| 6,253,338 | B1 | * | 6/2001  | Smolders        | 714/45  |
| 6,381,221 | B1 | * | 4/2002  | Legouet-Camus et al. | 370/252 |
| 6,460,107 | B1 | * | 10/2002 | Rao et al.      | 710/305 |
| 6,529,954 | B1 | * | 3/2003  | Cookmeyer et al. | 709/224 |
| 6,742,100 | B1 | * | 5/2004  | Schnee et al.   | 711/173 |
| 6,771,607 | B1 | * | 8/2004  | Russell et al.  | 370/252 |
| 6,792,392 | B1 | * | 9/2004  | Knight          | 702/186 |
| 7,133,422 | B2 | * | 11/2006 | Liu et al.      | 370/503 |
| 2003/0016670 | A1 | * | 1/2003 | Seidl et al.   | 370/392 |

OTHER PUBLICATIONS

Browne et al., "A Scalable Cross-Platform Infrastructure for Application Performance Tuning Using Hardware Counters," Nov. 2000, IEEE, 13 pages.*
John M. May, "MPX: Software for Multiplexing Hardware Performance Counters in Multithreaded Programs," 2001, 15th International Parallel and Distributed Processing Symposium (IPDPS'01).*
Jack Dongarra, Kevin London, Shirley Moore, Phil Mucci, and Dan Terpstra, "Using PAPI for hardware performance monitoring on Linux systems," Linux Clusters: The HPC Revolution, Jun. 25-27, 2001, 14 pages.*

* cited by examiner

*Primary Examiner*—Li B Zhen (57) ABSTRACT

Application program interface (API) reads a count value from a hardware counter in a network device. Then, the API resets the hardware counter and uses the count value to update a software counter. The software counter is stored in a memory location corresponding to the hardware counter. The memory is accessible both by the API and an application program using the API.

32 Claims, 10 Drawing Sheets

MEMORY STRUCTURE 370

| COUNTERS 910 | INDICES 920 |
|---|---|
| HARDWARE COUNTER 0 | 0000 0000 0001 |
| HARDWARE COUNTER 1 | 0000 0000 0010 |
| ... | ... |
| HARDWARE COUNTER 11 | 1000 0000 0000 |

COUNTER FUNCTIONS IN AN APPLICATION PROGRAM INTERFACE FOR NETWORK DEVICES

FIELD OF THE INVENTION

The present invention pertains to the field of networking. More particularly, this invention relates to counter functions in an application program interface for network devices.

BACKGROUND OF THE INVENTION

An application program interface (API) is a software interface that enables other software components, or software components and hardware components, to communicate and interact with one another. For instance, an application program does not need to know all the intricacies of how a particular hardware device operates and communicates. Instead, an API can be used between the application program and the hardware device. On one side, the API provides a predefined, high-level communications interface for the application program. On the other side, the API translates the high-level commands, or function calls, from the application program into the detailed instructions needed by the hardware.

Network devices often use hardware counters to count a variety of events, such as the amount of network traffic sent or received, the number of errors detected in a data stream, and the like. Due to size and cost constraints, hardware counters tend to be relatively small, often being 16 or 32 bits wide. A 32 bit hardware counter can count up to $2^{32}$, or about 4.3 billion, events before overflowing, or saturating. 4.3 billion events may sound like a large number, but when the events being counted are, for instance, bytes of data in a 10 Gigabit/second data stream, a 32 bit hardware counter overflows in less than 3.5 seconds.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention use an application program interface (API) to abstract a count history from a hardware counter in a network device up to a software counter where the count history is accessible to an application program. In various embodiments, the present invention allows a count history to be accumulated beyond the saturation limit of a hardware counter, provides a uniform and predetermined software counter interface for application programs regardless of the counter format used by the hardware counter, and introduces a number of useful functions for managing one or more counters. The longer count histories, uniform counter format, and various management functions can be used by application programs to, for instance, recognize data trends over long periods of time, better track data volume, and improve a wide variety of other statistical analyses on count data.

Figure 1:
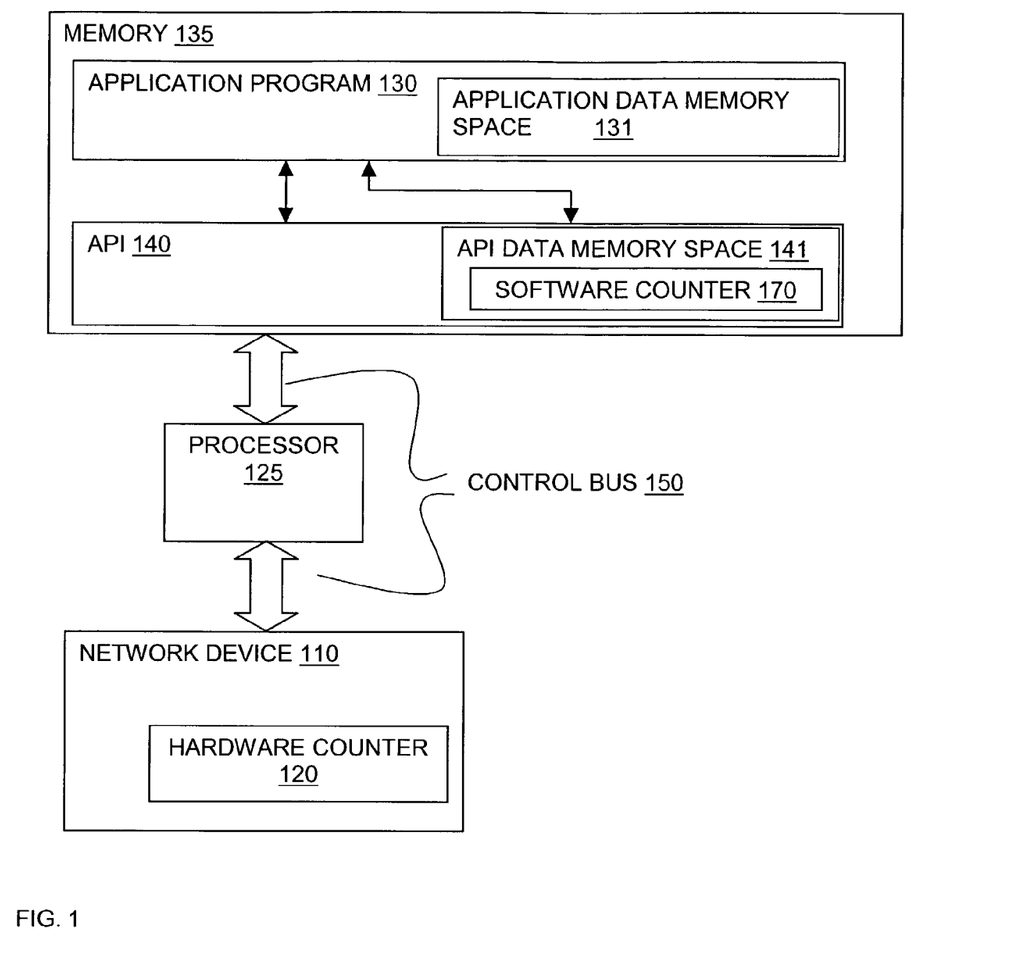
FIG. 1 illustrates a system incorporating one embodiment of the present invention.

FIG. 1 illustrates a system incorporating one embodiment of the present invention. In FIG. 1, a network device 110 could be coupled to many other network devices (not shown) through one or more high speed media (not shown), such as optical fiber. Network device 110 includes a hardware counter 120 and is coupled to processor 125 and memory 135 through control bus 150. Memory 135 includes application program 130 and application program interface (API) 140. Application program 130 includes application data memory space 131. API 140 includes API data memory space 141, and API data memory space 141 includes software counter 170.

Processor 125 executes application program 130 and API 140 to perform various functions. One of the functions performed by application program 130 relies on count data from hardware counter 120. Application program 130, however, does not have direct access to hardware counter 120. That is, application program 130 is not programmed with the detailed input/output operations required by network device 11 0 to access hardware counter 120. Instead, application program 130 issues a command, or function call, to API 140 to instruct API 140 to access hardware counter 120. API 140 is programmed with the needed information to access hardware counter 120, and, in response to the function call, API 140 retrieves a count value from hardware counter 120. Rather than simply supplying the raw count value directly to application program 130, however, API 140 uses the count value to update software counter 170. Software counter 170, in turn, is accessible to application program 130.

In one embodiment, application program 130 has direct access to software counter 170 using, for instance, an address pointer to a memory location occupied by software counter 170. In another embodiment, application program 130 accesses software counter 170 through API 140 by issuing another type of function call, identifying the counter by, for instance, an index value.

In one embodiment, when API 140 accesses hardware counter 120, API 140 performs a "latch and clear" operation on the counter. That is, API 140 reads the count value, resets the counter to zero, and updates software counter 170. As long as API 140 returns to read and reset counter 120 often enough, counter 120 will not saturate, or overflow.

In one embodiment, at software counter 170, API 140 adds the count value read from hardware counter 120 to the value currently stored at software counter 170, and then overwrites the currently stored value with the result. In other words, software counter 170 is larger than hardware counter 120 so that the count value can be accumulated over many reads of hardware counter 120.

Figure 2:
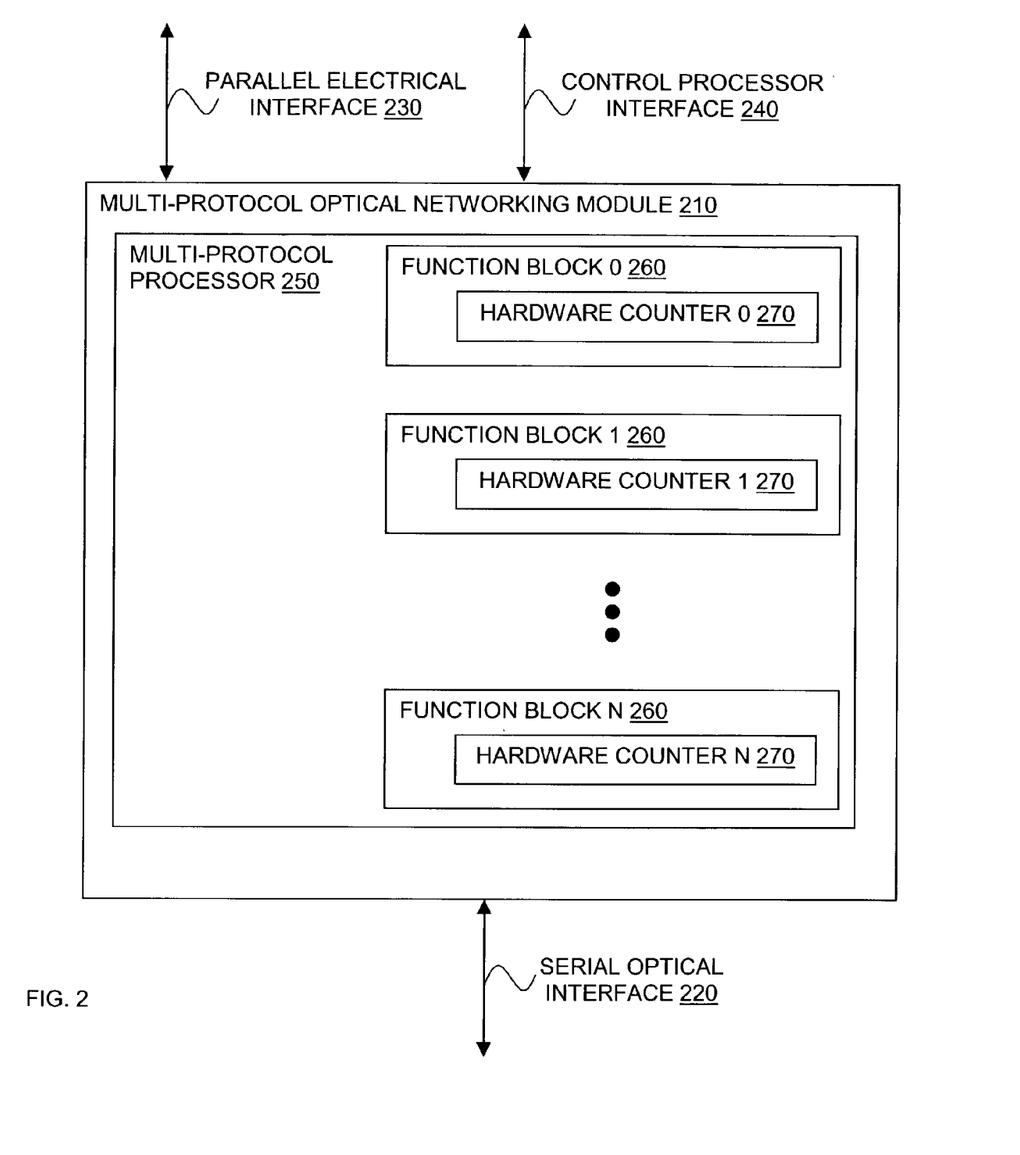
FIG. 2 illustrates one embodiment of a network device having multiple hardware counters.

Network device 110 represents any of a variety of devices in a network that has at least one hardware counter. FIG. 2 illustrates one example of a network device that has multiple hardware counters. In FIG. 2, the network device is a multi-protocol optical networking module 210. Module 210 includes a serial optical interface 220, a parallel electrical interface 230, and control processor interface 240. Module 210 converts optical signals to and from electrical signals in multiple different protocols, such as Gigabit Ethernet, Internet Protocol, and the like. Module 210 also includes a multi-protocol processor 250. Processor 250 includes N+1 function blocks 260. Each function block 260 performs a different function in processing multiple different protocols. Each illustrated function block 260 also includes a hardware counter 270. In an alternative embodiment, each function block 260 could include multiple hardware counters 270. In either case, various embodiments of the present invention can use API functions, such as the ones described with respect to FIG. 1, to abstract count data from one or more of the hardware counters 270 to corresponding software counters.

Figure 3:
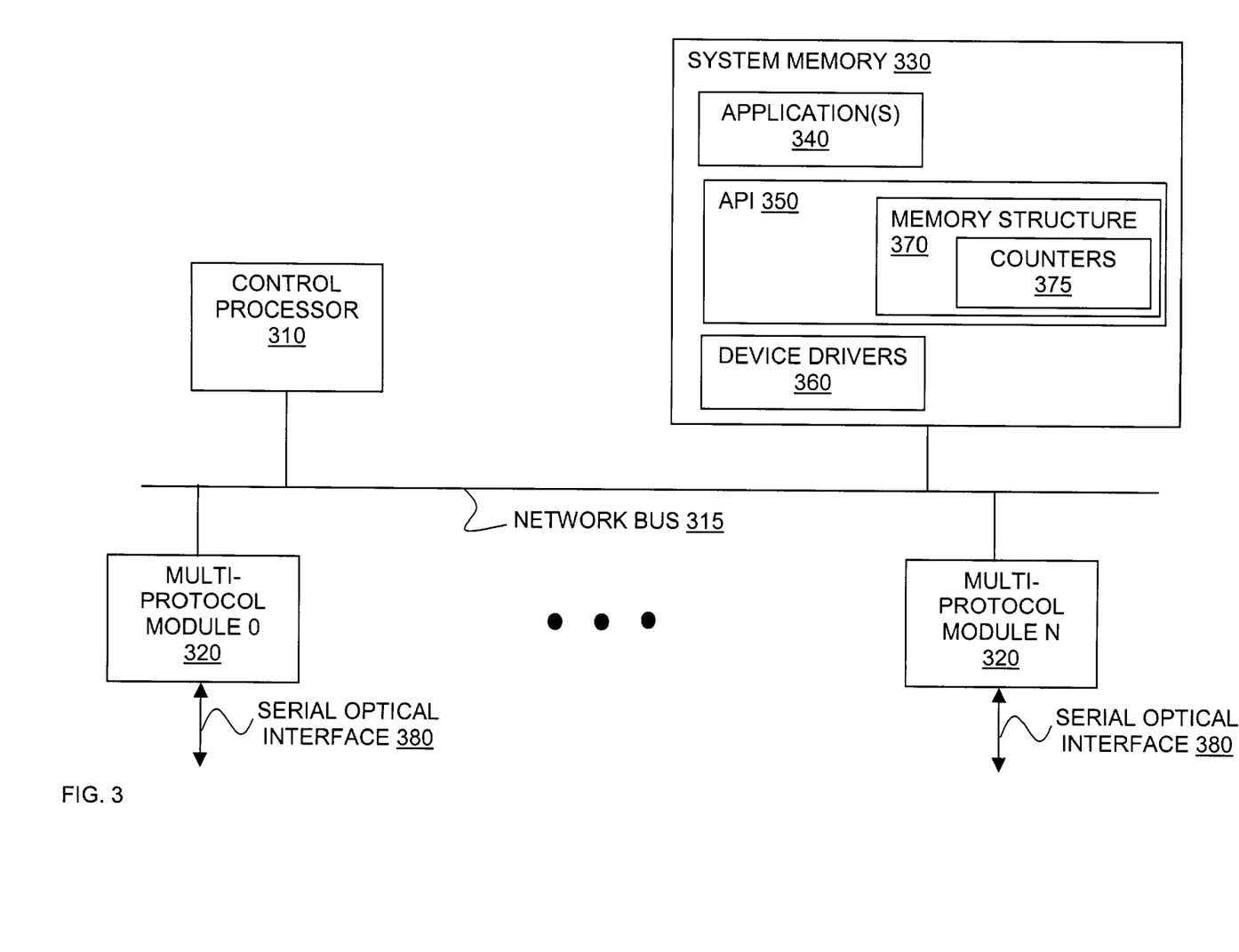
FIG. 3 illustrates another system incorporating one embodiment of the present invention.

FIG. 3 illustrates a system that includes several network devices with which various embodiments of the present invention can be used. In the illustrated system, the network devices are multi-protocol modules 320, some of which may be similar to multi-protocol module 210 from FIG. 2. The N+1 modules 320 are coupled to system memory 330 and control processor 310 by network bus 315. The system could be, for instance, a router in which each module 320 has an optical interface 380, and optical signals are processed to and from electrical signals in any of a number of protocols as the signals are routed through the router.

Like module 210 in FIG. 2, each module 320 may use one or more hardware counters to count various network traffic events. One or more applications 340 in system memory 330 may use count data from various ones of the hardware counters to perform, for instance, numerical or statistical analyses on data streams passing through the system.

Device drivers 360 are software components which contain bus write/read access functions. Each device driver 360 is designed to manage bus transactions over bus 315 for a particular type of function in modules 320. In which case, when applications 340 issue commands to API 350 to access one or more hardware counters, API 350 selects an appropriate device driver 360 and interacts with it to perform the requisite bus transactions to access the selected hardware counter(s).

Figure 4:
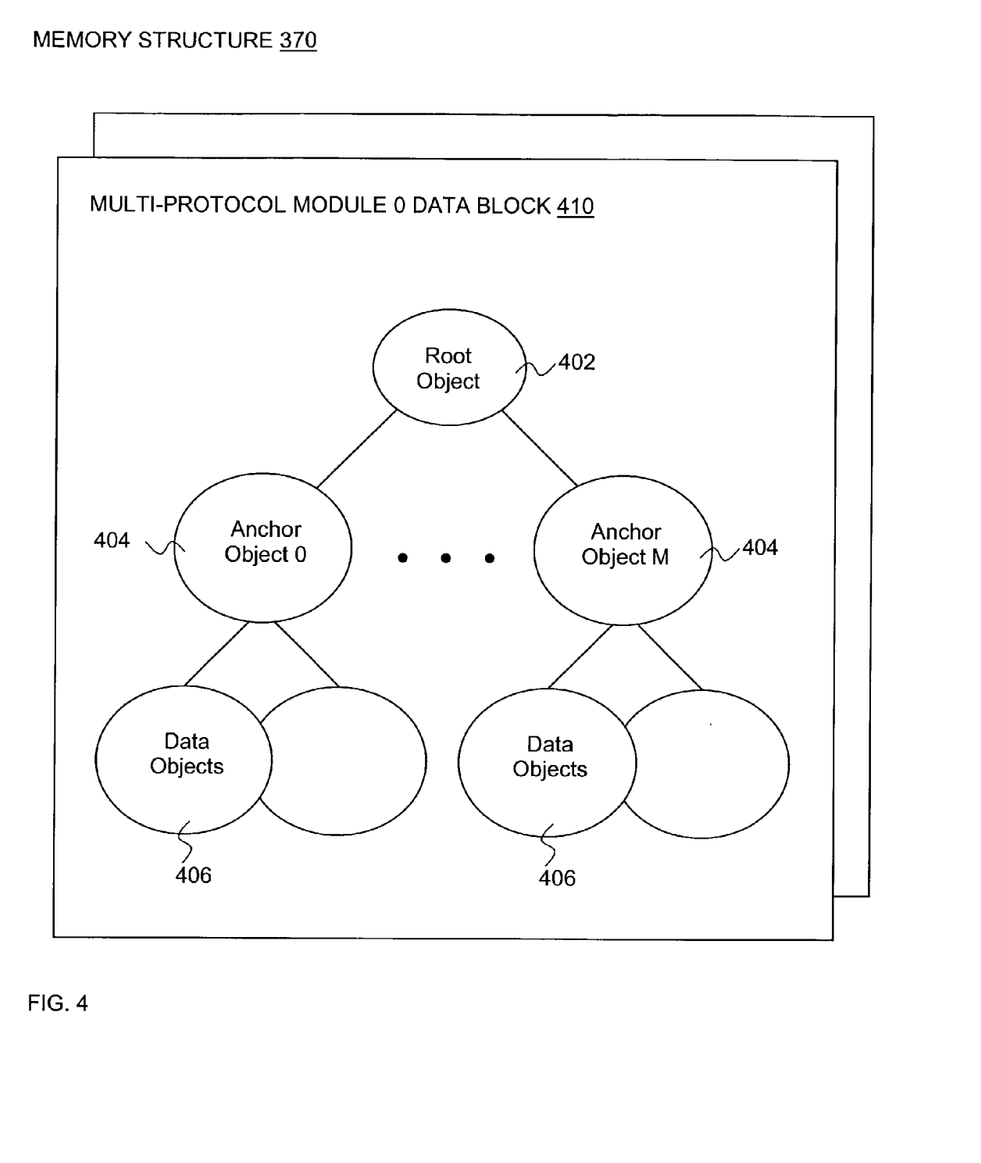
FIG. 4 illustrates an exemplarily memory structure containing one or more software counters according to one embodiment of the present invention.

Count data read from the hardware counters are used to update corresponding software counters 375 in memory structure 370 in the data section of API 350. Any number of data structures could be used for memory structure 370. FIG. 4 illustrates one possible embodiment of memory structure 370. In FIG. 4, each multi-protocol module 320 has a corresponding multi-protocol module data block 410 in memory structure 370. Each data block 410 has a hierarchical arrangement of data objects beginning with a root object 402. Root object 402 could correspond, for instance, to a multi-protocol processor having multiple function units. In which case, each anchor object 404 that depends from the root object 402 may correspond to a particular function unit. The data objects 406 that depend from the anchor objects 404 could correspond to various data registers within a given function unit, including one or more hardware counters.

In one embodiment, a data object corresponding to a hardware counter is used as the software counter. In other words, the data objects used for the software counters could be larger than the respective hardware counters, and could provide a uniform data format regardless of the format used by the respective hardware counters.

In one embodiment, memory structure 370 is directly accessible by application(s) 340. Each data object could be defined by an address pointer and the address pointers could be made available to the application(s) 340. In which case, application(s) 340 could use the address pointers to indicate particular hardware counters when issuing a function call to API 350.

In another embodiment, memory structure 370 is not directly accessible by application(s) 340. API 350 could provide a set of access functions for application(s) 340 to manipulate data objects 406, including the software counters. In which case, any number of indexing systems could be used to identify particular hardware counters to be accessed.

Figure 5:
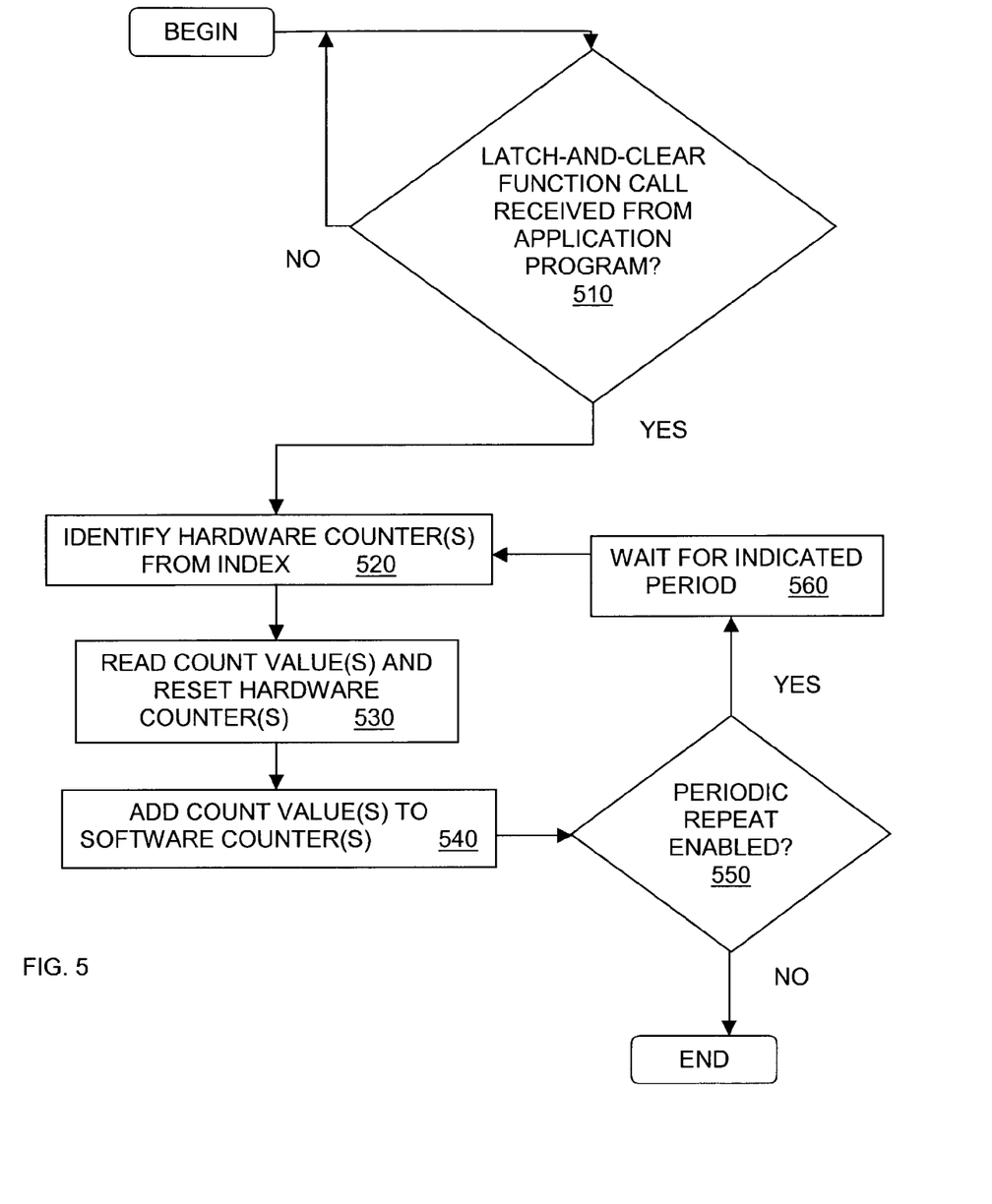
FIG. 5 illustrates one embodiment of an API latch-and-clear function call.

FIG. 5 demonstrates an API operational flow for one embodiment of the present invention. In the illustrated embodiment, the API performs a latch and clear function. In general, various embodiments of the latch and clear function read a count value from a hardware counter, reset the hardware counter, and use the count value to update a corresponding software counter at a memory location that is accessible, either directly or indirectly, to an application program.

As illustrated in FIG. 5, the API waits for a latch-and-clear function call to be received from an application program at 510. If the function call is received, the API identifies one or more hardware counters based on some form of index provided in the function call at 520. For instance, as mentioned above, the hardware counters could be identified by address pointers to data objects corresponding to the hardware counters. In another embodiment, a table of counter indices could be defined to identify the hardware counters. An example of a table of indices is discussed below with respect to FIG. 9.

Referring again to FIG. 5, at 530, the API reads the count value(s) from the identified hardware counter(s) and resets the identified hardware counter(s) to zero. At 540, the corresponding software counter(s) are updated with the count value(s).

The function call in the illustrated embodiment goes on to include an optional periodic repeat feature at 550. That is, in the function call, an application program can instruct the API to perform multiple latch-and-clear operations. Any number of approaches can be used to define the periodic repeat feature. For example, the application program could define a certain number of reads to perform and a certain time duration between reads, or a certain time duration during which to continue performing reads and a time duration between reads, or the like. Assuming the periodic repeat is enabled at 550, the API will return to 520 to loop through the process until the periodic repeat is no longer enabled.

In anther embodiment, the function call does not provide the option for periodic repeating. In which case, it is left to the application program to initiate a new latch-and-clear function sufficiently often to prevent the respective hardware counter form overflowing or saturating. An example of this is described below with respect to FIG. 10.

In yet another embodiment, the repeat function is not optional. That is, for example, the application program must define how many iterations to repeat, or how long to repeat, each time the function call is made.

Figure 6:
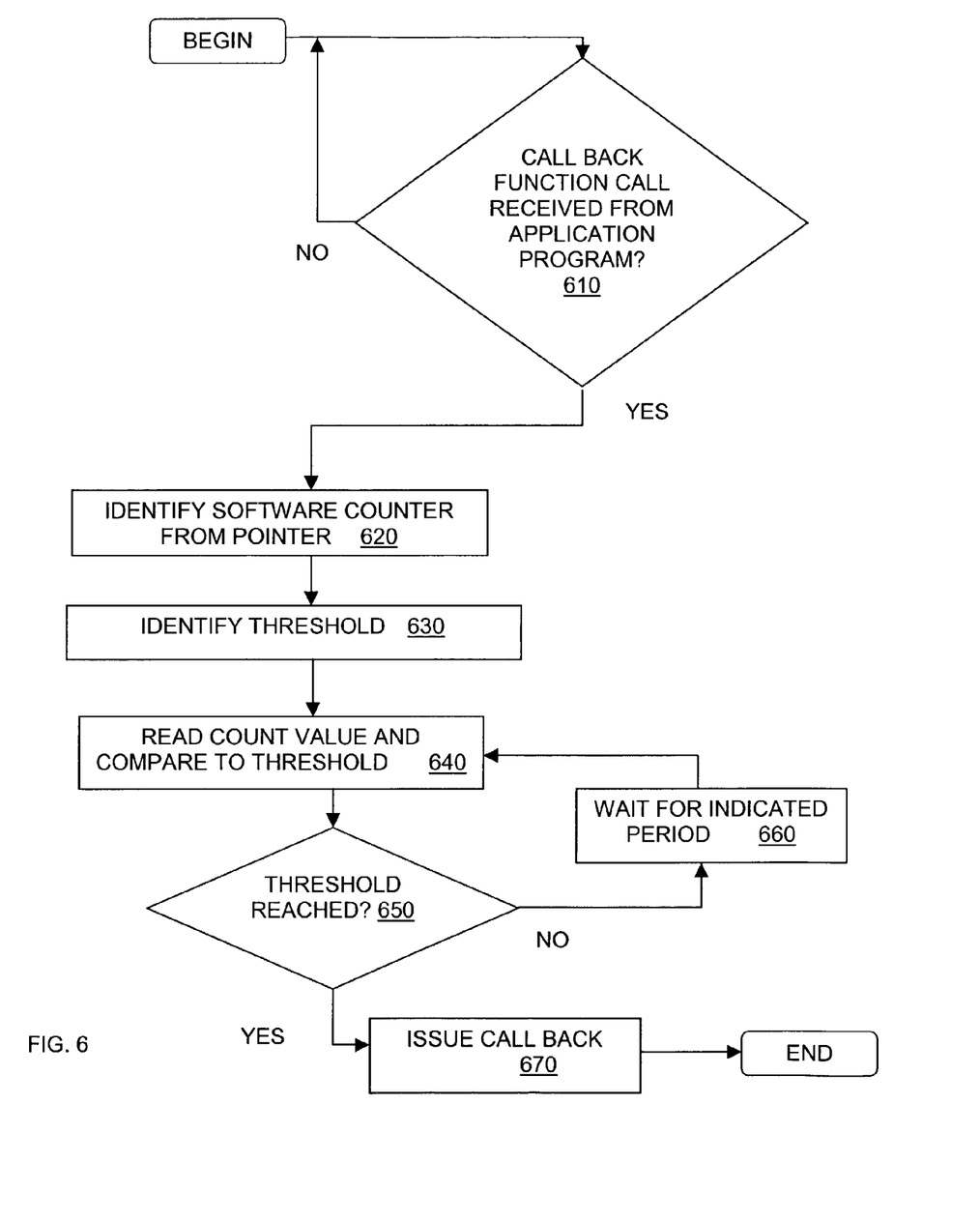
FIG. 6 illustrates one embodiment of an API call back function.

FIG. 6 demonstrates an API operational flow for one embodiment of the present invention to perform a call back function. In the illustrated embodiment, the API waits to receive a call back function at 610. If a call back function is received, the API identifies the software counter to which the function call is directed based on an address pointer at 620. As mentioned above, alternative embodiments may use any number of approaches to identify a particular counter.

At 630, the API identifies a threshold value for the software counter. For instance, if the software counter accumulates count data from the hardware counter over multiple reads, the application program may determine a value for the threshold that is some desired amount larger than the current accumulated value in the software counter. In an alternative embodiment, the threshold may be an off-set value provided by the application program to the API, and the API may add the off-set value to the current software counter value to determine the threshold. Any number of additional approaches could be used to define or identify the threshold value.

At 640, the API reads the value stored in the software counter and compares it to the threshold. If the threshold has not been reached at 650, the API waits at 660 for an indicated period of time. In one embodiment, the period of time between reading the software counter is based on the period of time between updating the software counter. That is, whenever the API updates the software counter, the API also compares the software counter to the threshold. In alternate embodiments, the time period between reading the software counter may be dynamically set by the application program. In another embodiment, the period may be a predetermined fixed duration that is used by the API for all call-back functions. If the threshold is reached at 650, the API issues a call back notification to the application program at 670 before ending.

Figure 7:
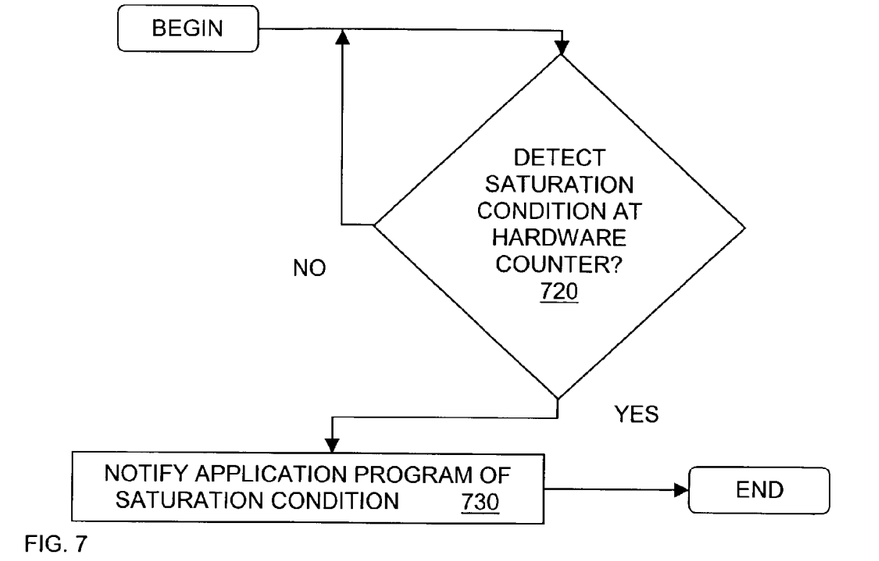
FIG. 7 illustrates one embodiment of an API saturation detection function.

FIG. 7 demonstrates an API functional flow for one embodiment of the present invention for training an application program. At 720, the API checks for a saturation condition at a hardware counter. For instance, the API could check for saturation during each time the hardware counter is read. In one embodiment, the hardware counter is designed so as not to wrap around upon saturation. That is, instead of restarting at zero when the maximum value is reached, the hardware counter holds the maximum value until reset. In which case, if the API detects the maximum value when the hardware counter is read, there is a good chance that the counter has saturated.

In another embodiment, the API could store a minimum expected value for the hardware counter. In which case, if the hardware counter overflowed and wrapped around to restart from zero, there is a good chance that the count value read from the hardware counter would be below the minimum expected value, suggesting that an overflow occurred. Any number of other approaches could be used to detect a saturation condition.

At 730, the API notifies the application program that the saturation condition was detected. In which case, assuming the application program was accumulating count values, the application program will know that it needs to latch and clear the hardware counter more frequently to avoid saturation. The application program may also determine that the count value accumulated in the software counter is not accurate, and issue a function call to the API to clear the software counter.

Figure 8:
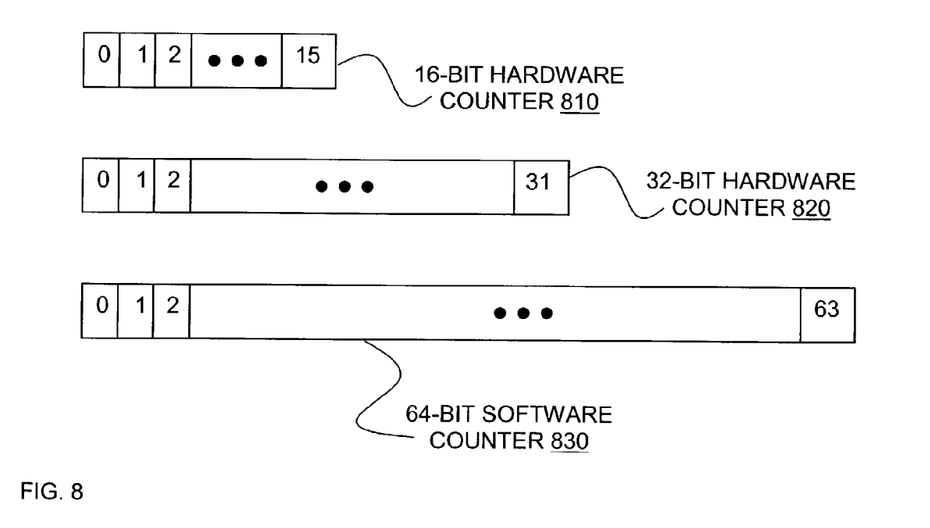
FIG. 8 illustrates exemplary embodiments of counter sizes.

FIG. 8 illustrates examples of counter sizes that could be used with various embodiments of the present invention. Hardware counter 810 is a 16-bit counter. Hardware counter 820 is a 32-bit counter. As mentioned above, counting high speed events, such as bytes in a 10 Gigabit/second data stream, can saturate 32-bit hardware counter 820 in just a few seconds. And, obviously, 16-bit hardware counter 810 would saturate in even less time. In order to accumulate count values over a longer period of time, software counter 830 is usually larger, for instance, having 64 bits in the illustrated embodiment. Since each additional counter bit doubles the count capacity for the counter, 64 bits can accumulate data over a much longer time. For instance, counting bytes in a 10 Gigabit/second data stream would take over 450 years to saturate 64 bit software counter 830.

A system could include several 16-bit hardware counters 810, as well as several 32-bit hardware counters 820. By using a uniform 64-bit software counter 830 for each hardware counter in one embodiment, the present invention can provide a uniform counter interface for each application program, regardless of the size and format of the corresponding hardware counters.

Figure 9:
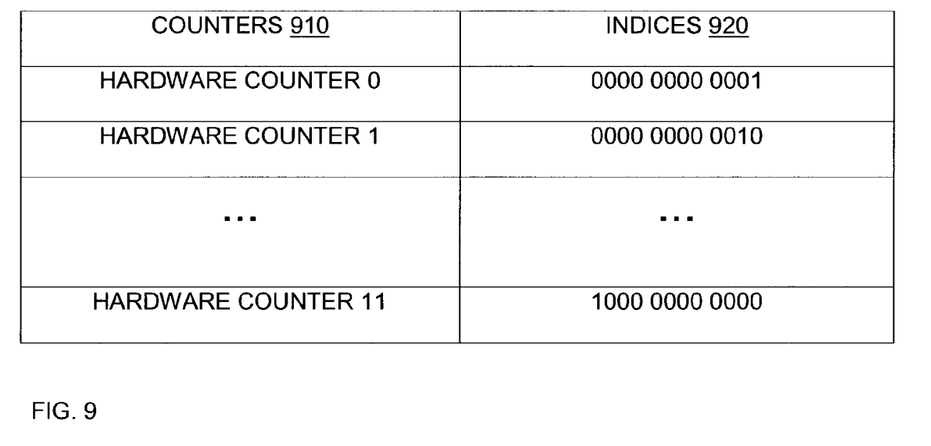
FIG. 9 illustrates one embodiment of counter indices.

FIG. 9 illustrates a table of indices for use with one embodiment of the present invention. In FIG. 9, each counter index 920 is a mask value that corresponds to a particular counter 910. That is, the index field is 12 bits wide, and there are 12 hardware counters 910. Each hardware counter 910 is represented by a single logical one at a unique position in the corresponding index field 920. In which case, an application program can indicate several of the hardware counters 910 in a function call using a single 12 bit index field by performing a logical OR of the selected indices 920.

Figure 10:
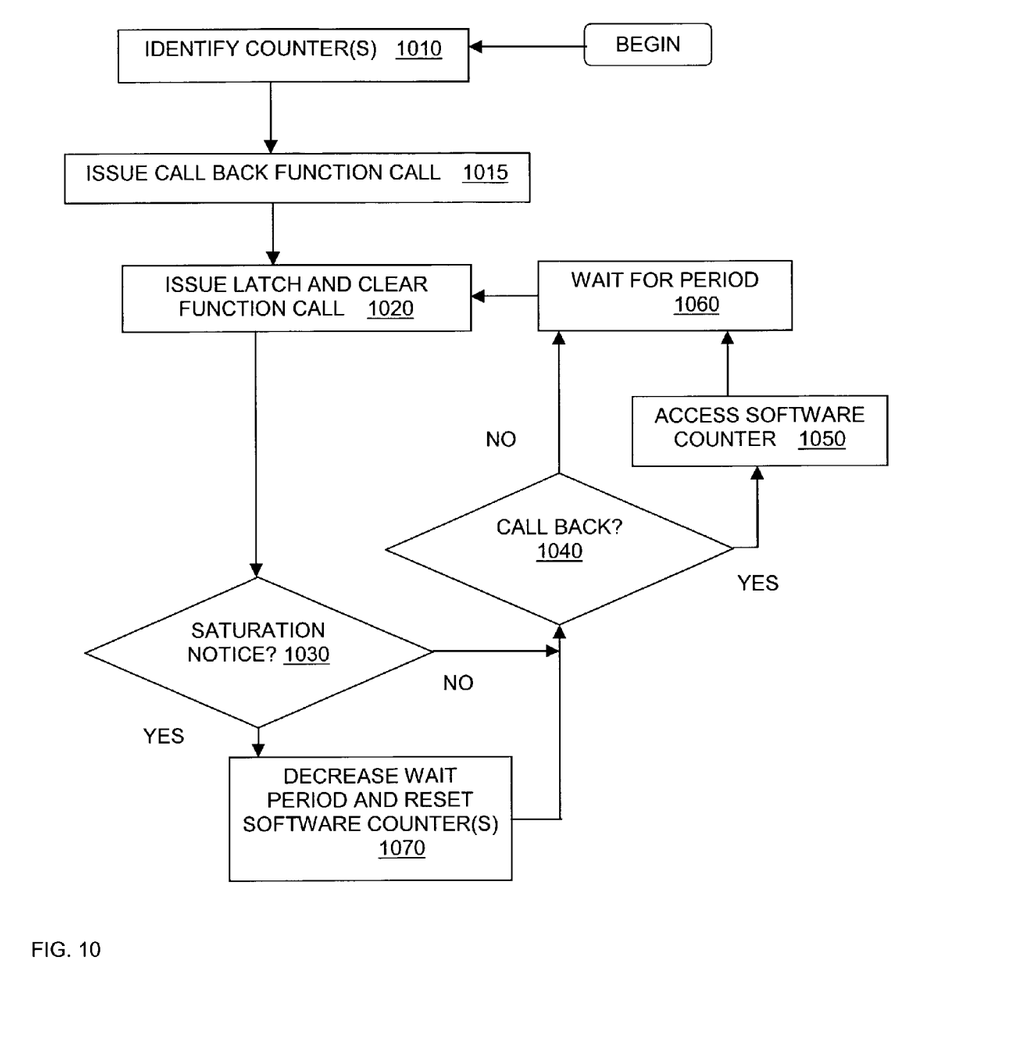
FIG. 10 illustrates one embodiment of API function calls from the perspective of an application program.

FIG. 10 demonstrates one embodiment of the present invention from the perspective of the application program. At 1010, the application program identifies one or more counters. As discussed above, the counters could be identified by a list of address pointers, a list of indices, an ORed combination of multiple masked indices, or the like. Multiple hardware counters could be identified in a single function call in order to, for instance, synchronize the tracking of several related counters over a period of time, having the same set of counters in each function call. In alternate embodiments, the set of counters could change from function call to function call. The set of identified counters may all be the same size, or the set of counters could include different sizes.

Once the hardware counters are identified, the application program issues a call to the API to install a call back function based on a threshold value for each of the corresponding software counters at 1015. At 1020, the application program issues a call to the API for a latch and clear function to update the software counters.

At 1030, the application program watches for a saturation notice. If one or more of the hardware counters has saturated, at 1070, the application program decreases the amount of time it will wait before initiating the next latch and clear. In the illustrated embodiment, the application program also resets the software counter(s) corresponding to the saturated hardware counter(s). That is, there is no way of knowing how much data was lost from the time the hardware counter(s) saturated, rendering the count value(s) in the software counter(s) unreliable. In other embodiments, depending on what the data is used for, the application program may not reset the software counter(s).

In one embodiment, the application program resets the software counter by directly accessing it in memory and setting it to zero. In another embodiment, the application program resets the software counter by issuing an appropriate function call to the API.

If no saturation notice is received at 1030, or after the time period is decreased at 1070, the application program watches for a call back notice at 1040. If a call back notice is received, the application program accesses the appropriate SW counter(s) at 1050. In other embodiments, a call back notice may initiate any number of different or additional functions in the application program. In yet another embodiment, the call back notice may not be returned to the same application program that initiated the latch and clear function.

If no call back is received at 1040, or after the application program accessed the software counter at 1050, the application program waits at 1060 until it is time to initiate the next latch and clear function at 1020. In alternate embodiments, the application program may loop back to 1010 and/or 1015 to identify a new set of hardware counter(s) and/or call-back threshold(s).

The function calls illustrated in FIGS. 5, 6, 7, and 10 all include a number of implementation specific details. Other embodiments may not include all the illustrated elements, may perform one or more of the elements in a different order, may combine or separate one or more of the elements, and may include additional elements.

Figure 11:
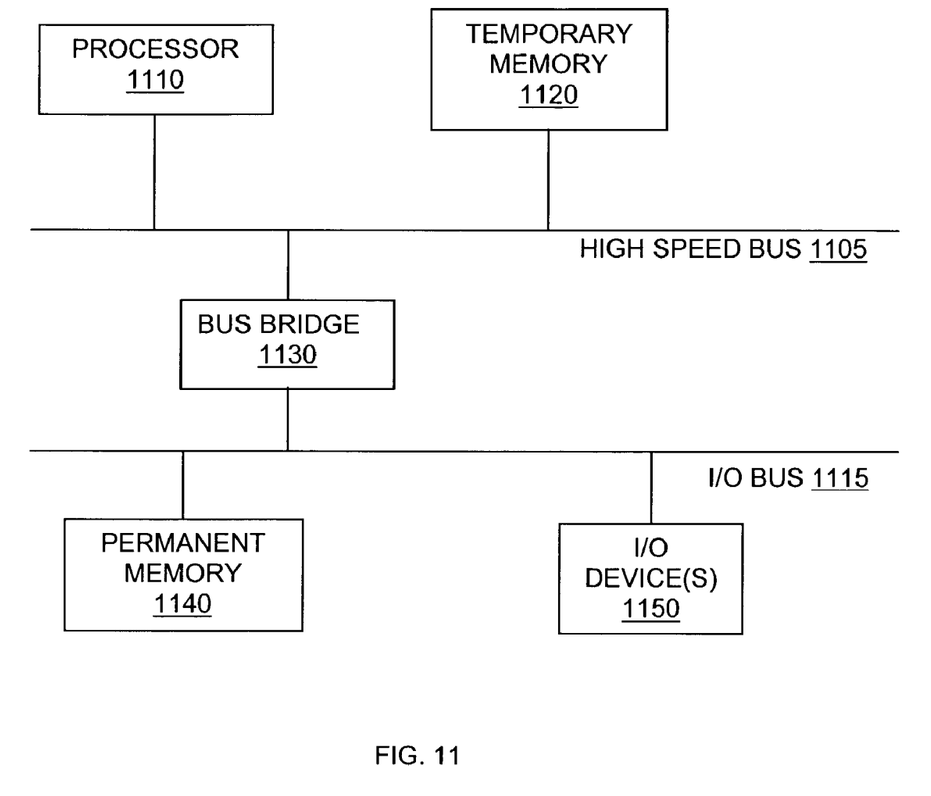
FIG. 11 illustrates a hardware system to execute one embodiment of the present invention.

FIG. 11 illustrates one embodiment of a hardware system intended to represent a broad category of computer systems such as personal computers, workstations, and/or embedded systems. In the illustrated embodiment, the hardware system includes processor 1110 coupled to high speed bus 1105, which is coupled to input/output (I/O) bus 1115 through bus bridge 1130. Temporary memory 1120 is coupled to bus 1105. Permanent memory 1140 is coupled to bus 1115. I/O device(s) 1150 is also coupled to bus 1115. I/O device(s) 1150 may include a display device, a keyboard, one or more external network interfaces, etc.

Certain embodiments may include additional components, may not require all of the above components, or may combine one or more components. For instance, temporary memory 1120 may be on-chip with processor 1110. Alternately, permanent memory 1140 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system of FIG. 11. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 1140.

Figure 12:
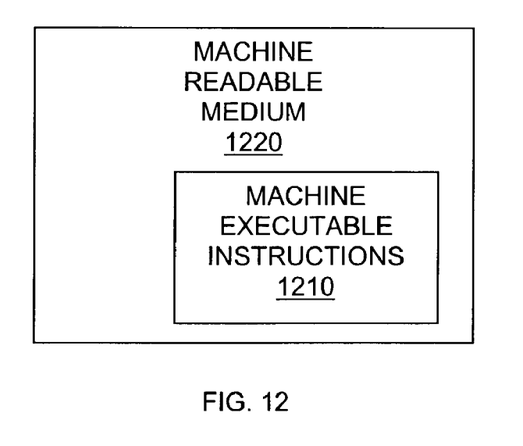
FIG. 12 illustrates a storage medium to store machine executable instructions for one embodiment of the present invention.

Alternately, as shown in FIG. 12, the software routines can be machine executable instructions 1210 stored using any machine readable storage medium 1220, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 1150 of FIG. 11.

From whatever source, the instructions may be copied from the storage device into temporary memory 1120 and then accessed and executed by processor 1110. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be implemented with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, counter functions in an application program interface for network devices is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method performed by an application program interface (API), the method comprising:
   reading a count value from a hardware counter in a network device;
   resetting the hardware counter;
   updating a software counter with the count value, said software counter being stored in a memory location in a memory, said memory location being associated with the hardware counter, and said memory being accessible by at least one of the API and an application program using the API;
   reading a plurality of additional count values from a plurality of additional hardware counters;
   resetting the plurality of additional hardware counters;

updating a plurality of additional software counters with the plurality of additional count values, said plurality of additional software counters being stored in a plurality of additional memory locations in the memory, at least one of said additional memory locations being associated with a respective one of the plurality of additional hardware counters; and receiving a function command from the application program prior to reading the count value or the plurality of additional count values, said function command to identify the hardware counter and the plurality of additional hardware counters from among a plurality of hardware counters and to initiate the reading, resetting, and updating, wherein each of the plurality of hardware counters is individually identified by a mask index, and wherein the application program provides a single index value to identify the hardware counter and the plurality of additional hardware counters by performing a logical CR operation on respective mask indices for the hardware counter and the plurality of additional hardware counters.

2. The method of claim 1 wherein the hardware counter is configured to count up to a first maximum count value and the software counter configured to count up to a second maximum count value higher than the first maximum count value.

3. The method of claim 1 further comprising:
repeating the reading, reselling, and updating at a periodic rate having a period that is shorter than an accumulation period before overflow for any of the hardware counter and the plurality of additional hardware counters.

4. The method of claim 3 wherein receiving a function command from the application program prior to reading the count value, includes identifyjpg the period for repeating, and initiatinge the repeating.

5. The method of claim 1 wherein the software counter has a longer accumulation period before overflow than the hardware counter or one of the plurality of additional hardware counters.

6. The method of claim 1 wherein the hardware counter has a bit width equal to one of 16 bits and 32 bits, and the software counter has a bit width equal to 64 bits.

7. The method of claim 1 further comprising:
providing a pointer for the memory location, and a corresponding index for the hardware counter, to the application program.

8. The method of claim 1 wherein the network device comprises a multi-protocol optical networking module having a serial optical interface, a parallel electrical interface, and a control processor interface.

9. The method of claim 1 wherein the network device comprises a network protocol processor to perform line-speed network traffic processing, wherein said line-speed network traffic processing includes using the hardware counter to count network traffic events.

10. The method of claim 9 wherein the network traffic events are selected from the group consisting of bits of traffic, bytes of traffic, frames of traffic, packets of traffic, bytes of overhead in traffic, bytes of payload in traffic, and data errors in traffic.

11. The method of claim 1 wherein the reading, resetting and updating to provide to the API and the application program using the API, a network device with a larger hardware counter than the network device is nominally configured.

12. The method of claim 1 wherein the plurality of additional hardware counters have a uniform bit width.

13. The method of claim 1 wherein the plurality of additional hardware counters have a plurality of different bit widths.

14. The method of claim 1 wherein the plurality of additional software counters each have a uniform bit width.

15. The method of claim 1 wherein the hardware counter and the plurality of additional hardware counters are located among a plurality of functional blocks within the network device.

16. The method of claim 1 wherein the network device comprises a first network device, and wherein the hardware counter and the plurality of additional hardware counters are located among a plurality of network devices including the first network device.

17. The method of claim 1 further comprising: receiving a call-back command from the application program, said call back command including an event threshold relative to a current count value of the software counter;
monitoring the software counter to determine when the event threshold is exceeded; and
initiating a call-back to the application program in response to the event threshold being exceeded.

18. The method of claim 1 further comprising:
receiving a call-back command from the application program;
detecting a saturation condition at the hardware counter during reading; and
initiating a call-back to the application program in response to the saturation condition.

19. The method of claim 18 wherein the saturation condition indicates to the application program that the hardware counter should be read and reset more frequently.

20. An apparatus comprising:
means for reading a count value from a hardware counter in a network device7 means for resetting the hardware counter; and means for updating a software counter with the count value count value to a current value stored in said software counter, said software counter being stored in a memory location in a memory , said memory location being associated with the hardware counter, and said memory being accessible by at least one of an application program interface (API) and an application program using the API;
means for reading a plurality of additional count values from a plurality of additional hardware counters;
means for resetting the plurality of additional hardware counters;
means for updating a plurality of additional software counters with the plurality of additional count values, said plurality of additional software counters being stored in a plurality of additional memory locations in the memory, at least one of said additional memory locations being associated with a respective one of the plurality of additional hardware counters; and
means for receiving a function command from the application program prior to reading the count value or the plurality of additional count values, said function command to identify the hardware counter and the plurality of additional hardware counters from among a plurality of hardware counters and to initiate the reading, resetting, and updating, wherein each of the plurality of hardware counters is individually identified by a mask index, and wherein the application program provides a single index value to identify the hardware counter and the luralit of additional hardware counters by performing a logical OR operation on respective mask indices for the hardware counter and the plurality of additional hardware counters.

21. The apparatus of claim 20 wherein the means for repeating the reading, resetting, and updating at a periodic rate having a period that is shorter than an accumulation period before overflow for the hardware counter.

22. The apparatus of claim 21 wherein the means for receiving the function command from the application program prior to reading the count value includes means for identifying the period for repeating, and initiating the repeating.

23. The apparatus of claim 20 further comprising:
means for providing a pointer for the memory location, and a corresponding index for the hardware counter, to the application program.

24. The apparatus of claim 20 wherein the network device comprises a network protocol processor to perform line-speed network traffic processing, wherein said line-speed network traffic processing includes using the hardware counter to count network traffic events.

25. The apparatus of claim 20 further comprising:
means for repeating the reading, resetting, and updating at a periodic rate having a period that is shorter than an accumulation period before overflow for any of the hardware counter and the plurality of additional hardware counters.

26. The apparatus of claim 20 further comprising:
means for receiving a call-back command from the application program, said call back command including an event threshold relative to a current count value of the software counter;
means for monitoring the software counter to determine when the event threshold is exceeded; and
means for initiating a call-back to the application program in response to the event threshold being exceeded.

27. The apparatus of claim 20 further comprising:
means for detecting a saturation condition at the hardware counter during reading; and
means for notifying the application program of the saturation condition.

28. An apparatus, comprising:
a processor;
a networking interface coupled to the processor, including a hardware counter, to couple the apparatus to a network, the hardware counter configured to hold a first maximum counter value; and
a storage medium coupled to a processor, having storage locations, a subset of which configurable to be a software counter, and programming instructions stored therein, to be executed by the processor, to:
read a count value from the hardware counter;
reset the hardware counter;
update the software counter with the count value by adding the count value to a current value stored in said software counter; read a plurality of additional count values from a plurality of additional hardware counters:
reset the plurality of additional hardware counters:
undate a plurality of additional software counters with the plurality of additional count values, said plurality of additional software counters being stored in a plurality of additional storage locations in the storage medium, at least one of said additional storage locations being associated with a respective one of the plurality of additional hardware counters; and
receive a function command from the application program prior to reading the count value or the plurality of additional count values, said function command to identify the hardware counter and the plurality of additional hardware counters from among a plurality of hardware counters and to initiate the reading, resetting, and updating, wherein each of the plurality of hardware counters is individually identified by a mask index, and wherein the application program provides a single index value to identify the hardware counter and the plurality of additional hardware counters by performing a logical OR operation on respective mask indices for the hardware counter and the plurality of additional hardware counters.

29. The apparatus of claim 28 wherein the programming instructions to update the software counter with the count value to effectively provide the application program a larger counter than one of the hardware counter and the plurality of additional hardware counters are nominally configured, said software counter being configured to hold a second maximum counter value larger than the first maximum counter value.

30. The apparatus of claim 28 wherein the programming instructions further include instructions for repeating the read, the reset and the update at a periodic rate having a period that is shorter than an accumulation period before overflow for the hardware counter or one of the plurality of additional hardware counters.

31. The apparatus of claim 30 wherein the programming instructions further include instructions for receiving a function command from the application program prior to read of the count value, said function command to identify the period for repeating, and initiate the repeating.

32. The apparatus of claim 28 wherein the network interface includes a network protocol processor to perform line-speed network traffic processing, wherein said line-speed network traffic processing includes using the hardware counter to count network traffic events.

* * * * *

UNITED STATES PATENT AND TRADEMARK OFFICE
CERTIFICATE OF CORRECTION

PATENT NO. : 7,509,656 B2  Page 1 of 1
APPLICATION NO. : 10/211046
DATED : March 24, 2009
INVENTOR(S) : Bian et al.

It is certified that error appears in the above-identified patent and that said Letters Patent is hereby corrected as shown below:

Column 9, line 18, "a logical CR" should read --a logical OR--
Column 9, line 28, "the reading, reselling, and" should read --the reading, resetting, and--
Column 9, line 34, "count value, includes" should read --count value includes--
Column 9, line 34, "includes identifyjpg the period" should read --includes identifying the period--
Column 9, line 35, "initiatinge the repeating." should read --initiating the repeating.--
Column 9, line 62, "method of claim 1 wherein" should read --method of claim 1, wherein--
Column 10, line 36, "a network device7 means" should read --a network device; means--
Column 10, line 38-39, "the count value count value to a current value stored in said software counter, said software counter" should read --the count value, said software counter--
Column 10, line 67, "luralit of additional" should read --plurality of additional--
Column 12, line 8, "undate" should read --update--

Signed and Sealed this

Ninth Day of November, 2010

David J. Kappos
*Director of the United States Patent and Trademark Office*